J. STOLAND.
MECHANISM FOR RAISING AND LOWERING THE TUBES OF GRAIN DRILLS.
APPLICATION FILED JULY 30, 1908.
915,245.
Patented Mar. 16, 1909.
2 SHEETS—SHEET 1.
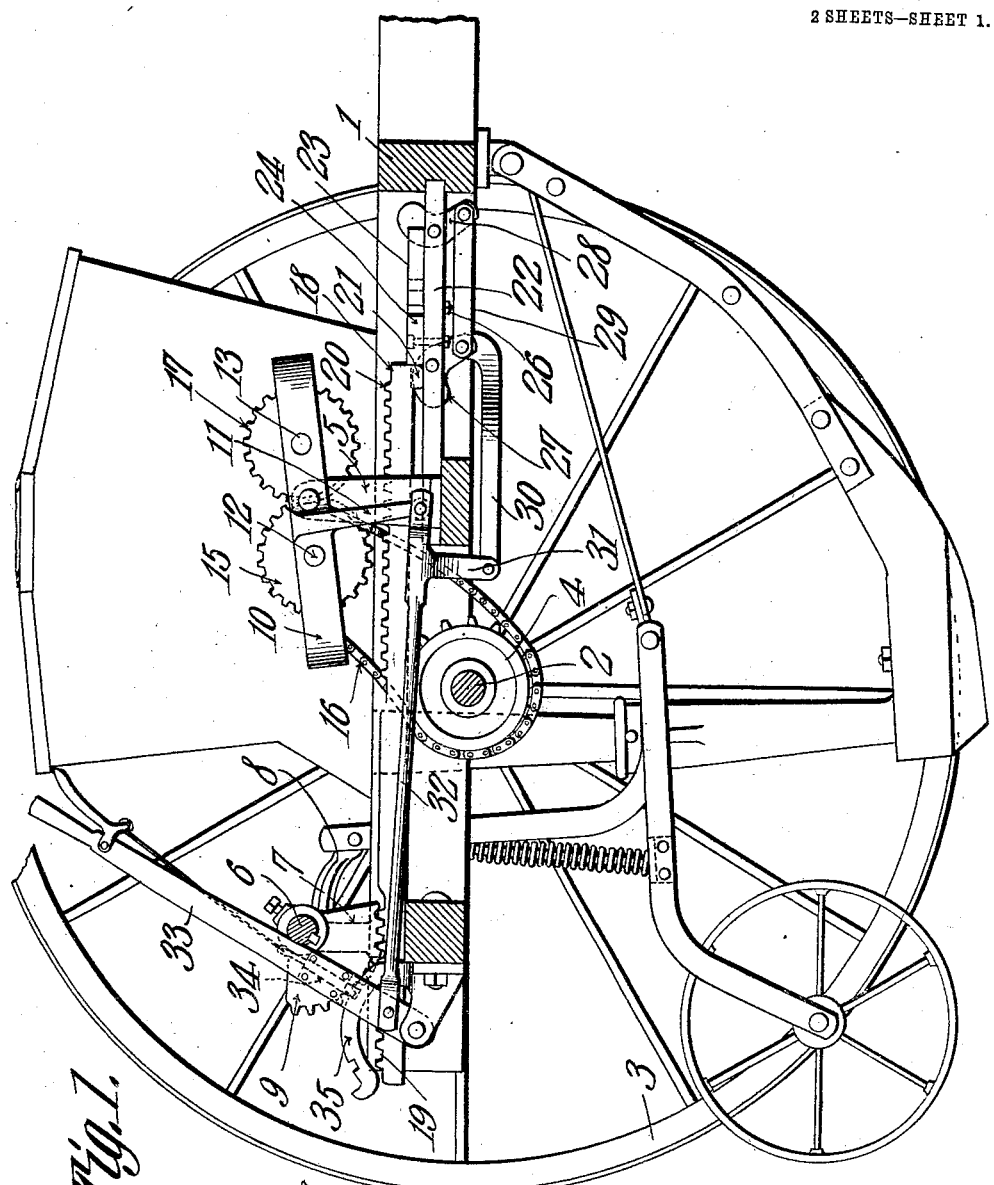
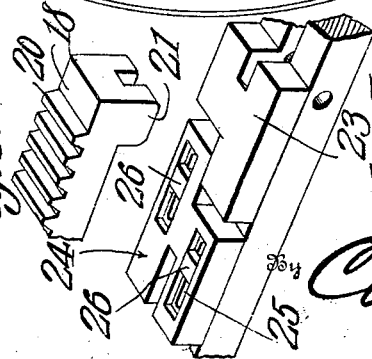
Witnesses
Inventor
John Stoland.
By C. A. Snow & Co.
Attorneys

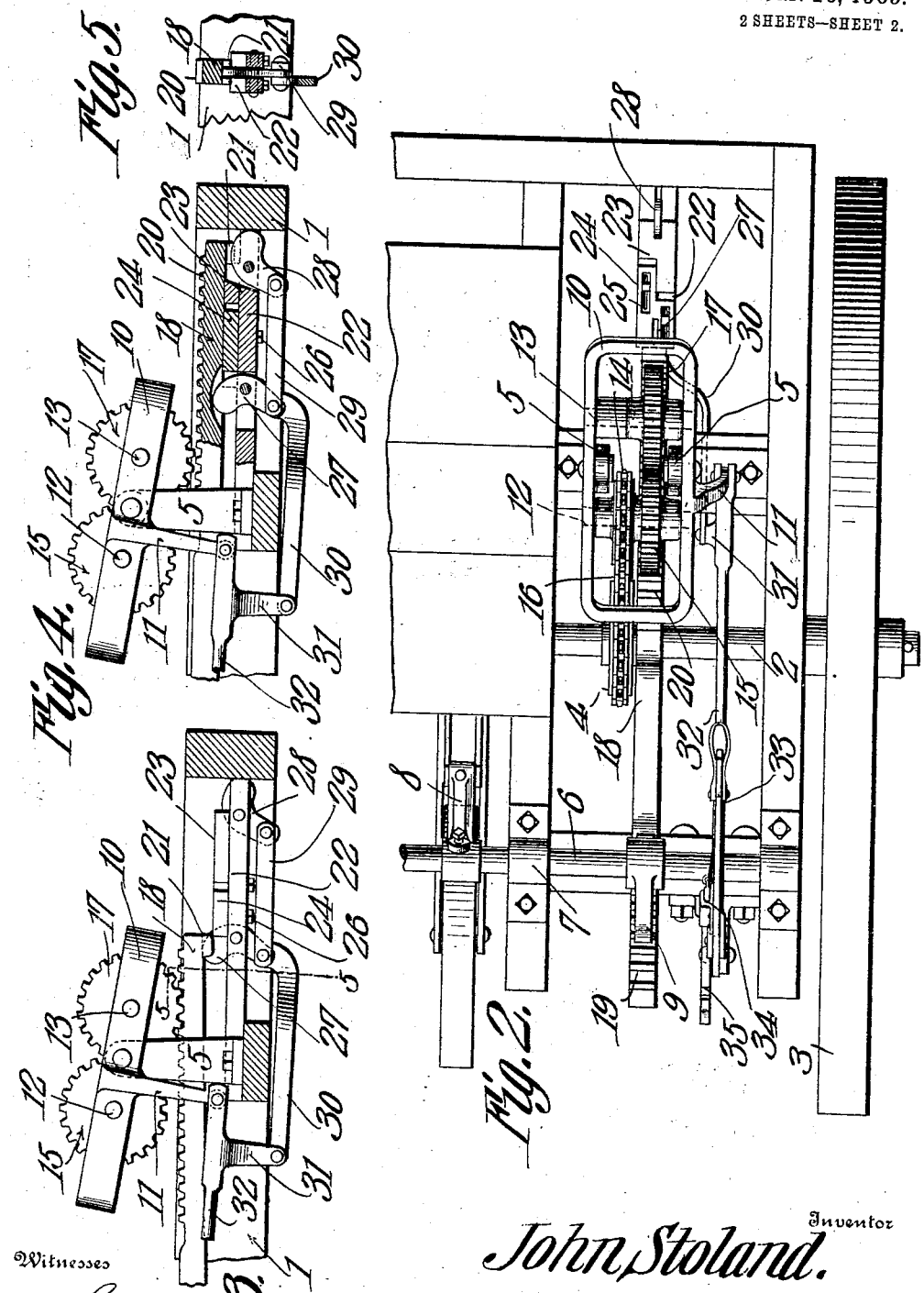

UNITED STATES PATENT OFFICE.

JOHN STOLAND, OF MOHALL, NORTH DAKOTA, ASSIGNOR OF ONE-THIRD TO WILLIAM J. STENGER, OF MOHALL, NORTH DAKOTA.

MECHANISM FOR RAISING AND LOWERING THE TUBES OF GRAIN-DRILLS.

No. 915,245.  Specification of Letters Patent.  Patented March 16, 1909.

Application filed July 30, 1908. Serial No. 446,175.

*To all whom it may concern:*

Be it known that I, JOHN STOLAND, a citizen of the United States, residing at Mohall, in the county of Ward and State of North Dakota, have invented a new and useful Mechanism for Raising and Lowering the Tubes of Grain-Drills, of which the following is a specification.

This invention has relation to mechanisms adapted to be used for raising and lowering the tubes of grain drills, and it consists in the novel construction and arrangement of its parts, as hereinafter shown and described.

The object of the invention is to provide a simple and effective mechanism of the character indicated, which may be actuated by the wheels upon which the implement is mounted for the purposes stated, thereby saving the time and labor usually expended with the ordinary construction of grain drill, wherein the operator has to manually effect the adjustment, or the raising and lowering of the tubes to the implement.

With the above object in view, the mechanism consists primarily of a sprocket-wheel mounted upon the axle of the drill, and which is connected by means of a sprocket chain with a sprocket-wheel journaled for rotation in a pivoted frame. A gear-wheel is mounted for rotation with the last said sprocket wheel, and meshes with a second gear wheel which is also journaled for rotation in the said pivoted frame. The lower portions of the said gear-wheels project below the lower portions of the edges of the said pivoted frame, and a rack bar is located below the said gear wheels and means is provided for raising and lowering one of the ends of said rack-bar, whereby the said teeth of the said bar may be brought into mesh with one or the other of the said gear wheels before mentioned. The seed-tubes of the implement are connected by arms with a shaft, and a gear segment is mounted upon the said shaft and is enmeshed with the second set of gear-teeth carried by the said rack-bar; consequently as the said rack-bar is moved longitudinally, the last said shaft is partially rotated and the said grain-tubes are consequently raised or lowered, according to the direction in which the said rack-bar is moved. A lever mechanism is mounted upon the implement, and is operatively connected with the said pivoted frame for the purpose of swinging the same, whereby one or the other of the said gear-wheels journaled therein may be brought into mesh with the gear-teeth of the said rack-bar, and, simultaneously, the said lever is also adapted to operate rockers provided in the frame of the implement, whereby the end of the said rack-bar is raised or lowered. Means being provided between the said lever mechanism and the said rockers to effect the operation as stated.

It will therefore appear that the invention consists primarily in novel mechanism and combination of parts especially adapted to perform specific functions of the character as set forth.

Figure 1 is an elevation of the mechanism, with parts in section. Fig. 2 is a plan view of the mechanism. Fig. 3 is a side elevation of a portion of the mechanism, showing the position of a rack-bar used therein when the tubes are about to be raised. Fig. 4 is a similar view, showing the position of said bar after the tubes have been raised. Fig. 5 is a transverse sectional view of the said bar and adjacent parts. Fig. 6 is a perspective view of one end portion of said bar. Fig. 7 is a perspective view of blocks used in the mechanism.

The grain drill to which the mechanism above mentioned is applied consists of the usual frame 1, which is mounted upon the axle 2, and which in turn is supported by the traction or ground wheels 3. The sprocket-wheel 4, is mounted upon the axle 2, and the standards 5, are erected upon the frame 1 near one side of the frame. The shaft 6, is journaled for partial rotation in the uprights 7 on the rear end of the frame. The arms 8, are fixed to the shaft 6, and are connected with the tubes of the implement. The gear segment 9, is fixed to the shaft 6. The frame 10, is pivotally mounted upon the upper end portions of the standards 5, and the said frame is provided with a depending arm 11. The axles 12 and 13, pass transversely through the frame 10, and the sprocket-wheel 14, is mounted upon the axle 12. The gear-wheel 15, is also mounted upon the axle 12, and is arranged to rotate with the sprocket-wheel 14. The sprocket-chain 16, passes around the sprocket-wheels 4 and 14, and is adapted to transmit rotary movement from the first said sprocket-wheel to the last said sprocket-wheel. The gear-wheel 17, is mounted upon the axle 13, and meshes with the gear-wheel 15. The lower portions of the gear-wheels 15 and 17, project below the lower edge of the frame 10. The rack-bar 18, is horizontally disposed, or substantially so, and is adapted to move longitudinally between the standards 5, 5. The said rack-bar 18, is provided with a set of gear teeth 19, which intermesh with the gear-segment 9, and the said rack-bar is also provided with a second set of gear-teeth 20, which lie under the lower portions of the gear-wheels 15 and 17, and which, at times, is adapted to engage one or the other of the said gear-wheels, as will hereinafter appear.

The rack-bar 18 is provided at the under side of one of its ends with a lug, 21. That end of the rack-bar 18, which carries the lug 21, is adapted to move longitudinally over the guide 22, which, in turn, is supported by portions of the frame 1. The blocks 23 and 24 are mounted upon the guide 22, and the block 24 is provided with elongated slots, 25, which receive the bolts 26, and by means of which the said block 24 may be adjusted longitudinally along the said guide 22. The rockers 27 and 28 are pivotally mounted in the guide 22, and are adapted at times to be projected beyond the upper surfaces of the blocks 23 and 24 for the purpose of lifting the free end portion of the rack-bar 18, so that the set of gear-teeth, 20, thereof, may be brought into engagement with one or the other of the gear wheels 15 or 17. The lower end portions of the rockers 27 and 28 are connected together by means of the rod 29, and the link 30, connects one end of the rod 29 with the lug 31, which is attached to the under side of the rod 32. One end of the said rod 32 is pivotally connected with the lower end portion of the depending arm 11, carried by the frame 10, while the opposite end portion of the said rod 32 is pivotally connected with the lever 33, which is fulcrumed at a suitable point upon the frame 1. The said lever 33 is provided with a pawl mechanism, 34, which is adapted to engage the gear segment 35, also mounted upon the frame 1, of the implement.

Presuming that the parts are in the positions as shown in Fig. 1 of the drawings, and as the grain drill moves over the surface of the ground, and it is desired to elevate the grain tubes, the lever 33 is swung at its upper end to the rear; through the connecting rod 32 the frame 10 is swung upon its pivot and the gear wheel 17 is swung down into the position as shown in Fig. 3 of the drawings. At the same time the link 30 moves with the rod 32 and swings the rocker 27 upon its pivot, so that the rocker elevates the rack-bar 18 and brings the teeth of the said bar into mesh with the teeth of the wheel 17. The parts are then in the positions as shown in Fig. 3 of the drawings. As the axle 2 rotates, rotary movement is transmitted therefrom through the sprocket wheels 4 and 14 and the sprocket chain 16 to the axle 12, and from the said axle 12 rotary movement is transmitted through the wheel 15 to the wheel 17. As the said wheel 17 is in mesh with the rack-bar 18 the said bar is moved in a forward direction until the lug 21 carried thereby arrives at the end of the block 23, when the said rack-bar 18 falls and the parts assume the positions as shown in Fig. 4 of the drawings. As illustrated in the said figure, the lower side of the rack-bar 18 is slotted to receive the upper end portion of the rocker 27. As the bar 18 moves in a forward direction as above described, the gear teeth 19 thereon partially rotate the segment 9 and the shaft 6 is turned and the arms 8 are elevated, which movement on the part of the said arms 8 elevates the frame 2. When it is desired to lower the grain tubes of the drill the upper end portion of the lever 33 is swung in a forward direction, which, through the connecting rod 32 swings the frame 10, so that the wheel 15 is lowered, and the wheel 17 is elevated. At the same time the link 30 moves with the rod 32 and swings the rocker 28, so that the upper end portion thereof will lift the lug 21 above the upper surface of the block 23. Thus the bar 18 is free to move in a rearward direction, and, under the weight of the grain tubes, said bar 18 is started in its rearward movement, which is completed by the wheel 15, which meshes with the teeth 20 carried by the said bar, and forces the bar 18 to the rear. As the bar 18 moves in a rearward direction, the movement of the segment 9, the shaft 6 and the arms 8 is the reverse of that above described, and, when the grain tubes have assumed their lowermost position, the bar 18 falls, so that the lug 21 carried thereby is located behind the rear edge of the block 24, and the teeth 20 are moved out of engagement with the teeth of the gear wheel 15.

It will be seen that, by providing an adjustable block 21, the path of movement of the rack-bar may be increased or diminished, as desired, and, as the extent of the rotation of the shaft 6 is coincident with that of the movement of the said rack-bar, the longer movement that the said rack-bar possesses, the greater will be the degree of rotation of the said shaft 6. By such provision, the grain tubes may be raised or lowered to any desired extent.

Having described my invention, what I claim as new, and desire to secure by Letters Patent, is:—

1. A mechanism for raising and lowering the tubes of a grain-drill comprising a shiftable bar, a frame pivotally mounted above the bar, intermeshing wheels carried by the frame, said wheels being adapted to alternately have engagement with the bar, and a lever mechanism for swinging the frame.

2. A mechanism for raising and lowering the tubes of a grain drill comprising a shiftable bar, intermeshing wheels located above the bar, said wheels being adapted to alternately have engagement with the bar, and means for bringing the bar into engagement with one or the other of the said wheels.

3. A mechanism for raising and lowering the tubes of a grain drill comprising a shiftable bar, means operatively connecting the bar with the tubes of the drill, means for shifting the bar, a depending lug carried by the bar, a sectional block located under the bar and adapted to be engaged at its ends by the said lug, means for adjusting the position of one of the sections of the block, and means for disengaging the lug from the said block.

4. A mechanism for raising and lowering the tubes of a grain drill, comprising a shiftable bar, means operatively connecting the bar with the tubes of the drill, a traction means for shifting the bar, a depending lug carried by the bar, a sectional block located below the bar and adapted to be engaged at its ends by the lug carried by the bar, means for shifting one of the sections of the said block, and means for disengaging the lug from the ends of the said block.

5. A mechanism for raising and lowering the tubes of a grain drill comprising a shiftable bar, a frame pivotally mounted above the bar, intermeshing wheels carried by the frame, said wheels being adapted to alternately have engagement with the bar, means for locking the bar in a shifted position, and a lever mechanism for simultaneously swinging the said frame and releasing the bar from a locked position.

6. A mechanism for raising and lowering the tubes of a grain drill comprising a shiftable bar, means operatively connecting the bar with the tubes of the drill, a frame pivotally mounted and carrying intermeshing wheels, a traction means operatively connected with said wheels, said wheels being adapted to alternately engage the bar, means for securing the bar in an adjusted position, and a lever mechanism for simultaneously swinging the frame and releasing the bar from its secured position.

7. A mechanism for raising and lowering the tubes of a grain drill comprising a shiftable bar, means operatively connecting the said bar with the tubes of the drill, a pivotally mounted frame, intermeshing wheels carried by the frame, and adapted to alternately engage the bar for the purpose of shifting the same, a traction means operatively connected with the said wheels, a block located in the path of movement of the bar, a depending lug carried by the bar and adapted to engage the ends of the block, and a lever mechanism for simultaneously swinging the frame and a bar-releasing mechanism operatively connected with the said lever-mechanism.

In testimony that I claim the foregoing as my own, I have hereto affixed my signature in the presence of two witnesses.

JOHN STOLAND.

Witnesses:
K. H. KANNE,
P. A. BENSON.